Patented Mar. 31, 1931

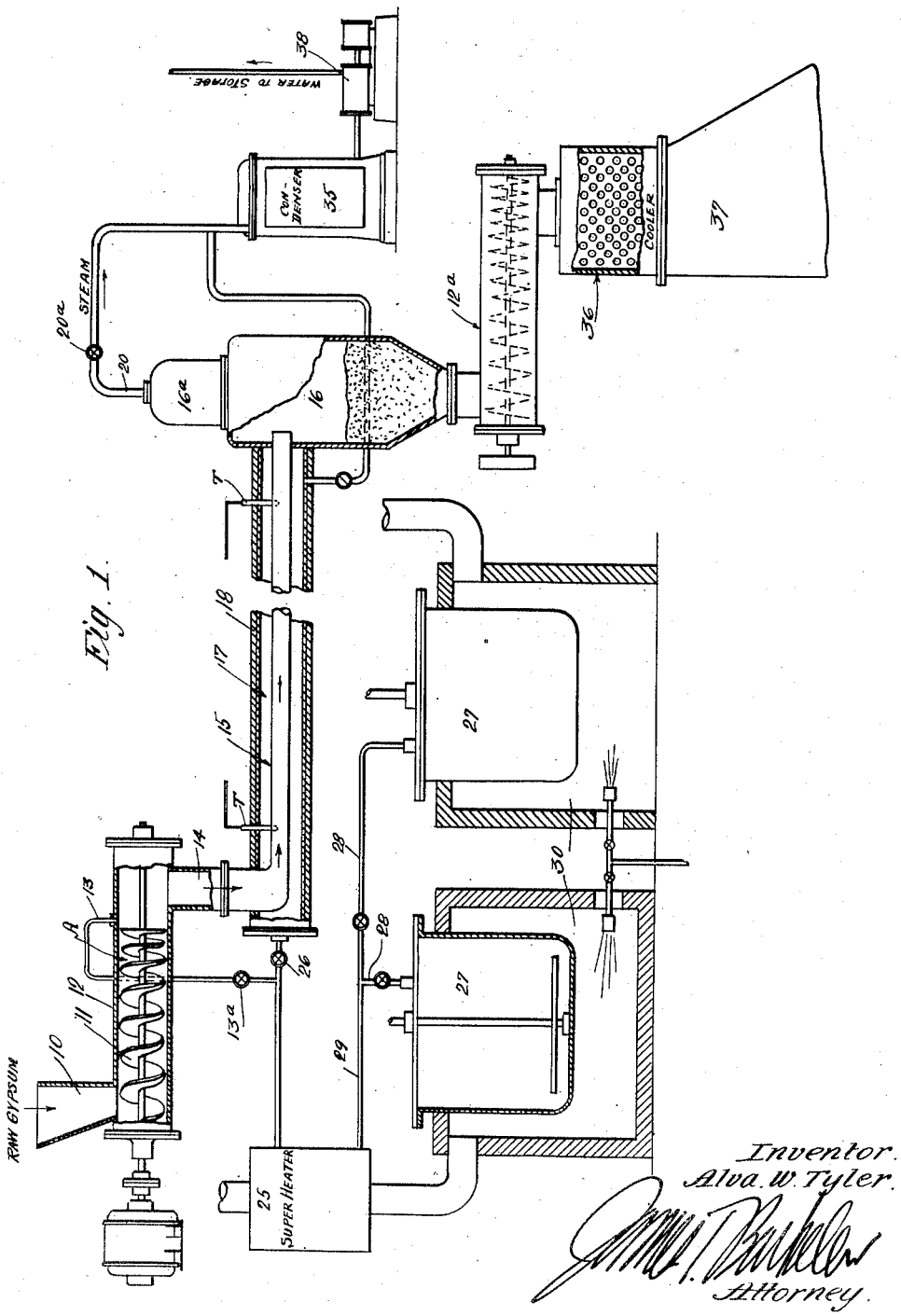

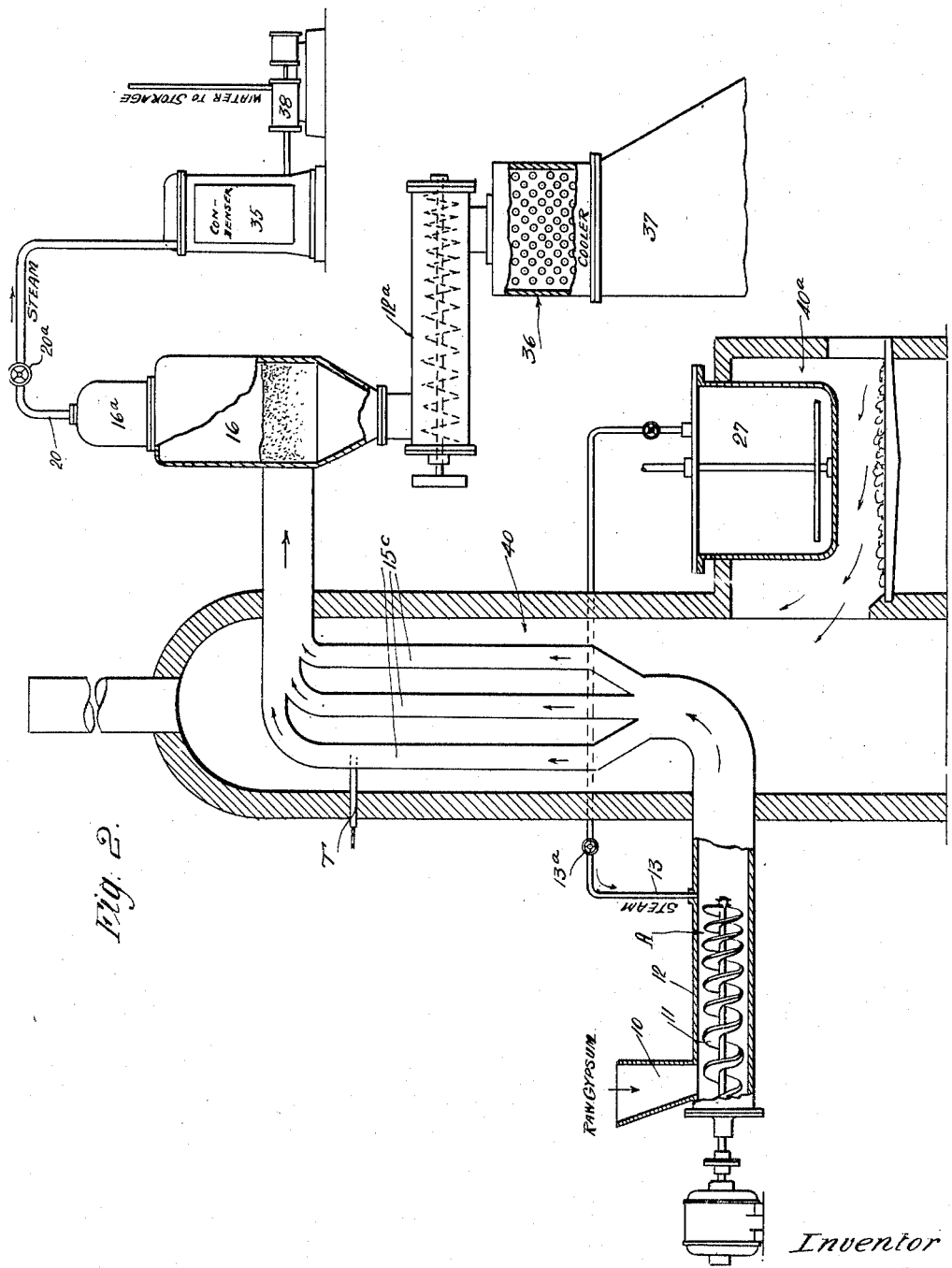

1,798,857

UNITED STATES PATENT OFFICE

ALVA W. TYLER, OF SAN FRANCISCO, CALIFORNIA

METHOD FOR CONTINUOUS CALCINATION OF GYPSUM

Application filed August 31, 1925. Serial No. 53,478.

This invention has reference to the calcination or decomposition of materials that may be broken down by heat; and more specifically but not limitedly, to the calcination or dehydration (partially) of gypsum for the manufacture of gypsum plaster. Both the general and specific objects of the invention may best be gathered from the following description, and particularly from what is said regarding the difficulties and deficiencies inherent in present methods and of the manners in which my process and apparatus overcome such difficulties and supply such deficiencies. For the purposes of this description the calcination of gypsum will be spoken of particularly.

Raw gypsum, as found in nature, somewhat commonly known after grinding as land plaster, is more or less pure calcium sulphate carrying a certain percentage of water of crystallization. The process of calcination to form gypsum plaster is merely one involving heating of the gypsum to a certain temperature to drive off a portion of the water of crystallization. In order to obtain uniform results and produce a good plaster it is highly desirable that the temperature should be evenly applied to particles or bodies of gypsum so that every particle will be heated to the temperature necessary for calcination, and that no parts of the gypsum shall be heated too highly. The practical temperature at which gypsum freely calcines is about 250° F., but in order to produce the required quality of calcined gypsum for plastering purposes it is necessary to carry the finishing temperature to about 330° F. The higher the finishing temperature the more water of crystallization is driven off and the denser the plaster product becomes when re-hydrated. When finishing temperatures about 500° F. or 600° F. are reached practically all the water of crystallization is driven off and rehydration occurs with such difficulty that the material has no practical value as a plaster. Practical finishing temperatures run from about 330° F. to 380° F. or even to 420° F. The great bulk of what is ordinarily known as "calcined gypsum" and used for all regular plastering purposes, however, is calcined at about the finishing temperature noted above (330° F.) and at that temperature still retains about 5% to 6% of its water of crystallization. Variation in the purity of the raw gypsum will naturally vary the total quantity of water of crystallization in a given quantity of the material and will likewise vary the percentage of water remaining in the calcined material. Different qualities of raw gypsum rock may require different finishing temperatures to give the required degree of calcination and therefore when "calcining temperature" is spoken of in this specification I mean that temperature at which it is necessary to finish a given pulverized gypsum material in order to give the required degree of calcination, or in other words that degree of calcination which produces the highest quality of calcined product for the purpose it is to be used.

The only process of which I am aware in which a uniform calcined gypsum product of high quality is turned out is that batch process ordinarily known as the kettle method, and in which finely pulverized gypsum is heated during agitation in kettles or vats to about the temperatures stated, the required part of the water of crystallization passing off as steam into the atmosphere, the finished batch then being discharged and the kettle refilled. The escaping steam carries with it large quantities of dust, which is not only a loss but very objectionable and often damaging to objects with which it comes in contact. In order to obtain continuity of operation in a plant as a whole, a number of kettles must be used; but the actual calcining operation is not continuous in this process. This process has been recognized as being inefficient, particularly as to utilization of heat; but as it can be relied upon to produce a uniform high quality calcined product, it is still in major use.

Other processes have been proposed and used, among which there is a process of passing gypsum in fairly large bodies through a rotary kiln, through which products of combustion pass and come into direct contact with the gypsum to heat it. Complete calcination does not take place in a rotary kiln, but takes place in what is known as a soaking bin, into which the heated gypsum goes from the kiln and stands for a period long enough for the body of gypsum to become as uniformly calcined as possible. A number of such bins are necessary for each kiln, as one must be in the soaking process while another is being emptied and still another being filled. The difficulties encountered in this process, however, are of such a nature that uniform high quality of calcined product is not attained. The gypsum cannot be crushed fine, as the usual forced or induced draft through the rotary kiln will carry off large quantities of it. Consequently it is crushed so that as few fines are produced as possible. Usually the crushing is such that no particles, larger than about ⅝ to ¾ inch ring are obtained; the large size of the bodies and also their great variation in size causes uneven heating, which produces uneven calcination and a poor quality product.

In the kettle process gypsum is first finely ground before being calcined, and this fact, together with the fact that the temperature of the kettle can be more closely regulated than can be the temperature of the kiln, induces uniform heating of gypsum and, therefore, uniform calcination to produce a high quality product.

My invention is aimed at overcoming the difficulties herein set out; in the main, to provide a continuously operating process in which the gypsum is continuously calcined, in which a uniform high quality calcined product is maintained, and in which heat efficiency is high. Various other objects and corresponding accomplishments of my invention will be understood from the following detailed description of preferred modes of procedure and preferred forms of apparatus. These prescribed procedures and apparatus are given as specific and illustrative examples or embodiments of my invention, but are not given as limitations upon the invention itself.

For the purpose of giving these descriptions, I refer to the accompanying drawings, in which:

Fig. 1 is a more or less diagrammatic view of one form of apparatus; and

Fig. 2 is a similar view showing another form of apparatus.

The crude gypsum rock is first crushed and ground, as for the kettle process, either to its ultimate fineness or to somewhat coarser particles with the idea of a final regrinding. After the gypsum is initially ground to what may be called fine size—fine enough that it may be fluidized and mobilized by a stream of gas through a heating and calcining chamber,—this finely ground gypsum is delivered in a typical instance to a hopper 10 feeding a worm conveyer 11 that rotates within a casing 12. The terms "mobilize" and "fluidize" will be defined hereinafter. Although the function performed by this worm conveyer may be performed by other types of apparatus, I have preferred here to show the worm conveyer as it is efficient for the purpose. Its function is continuously to feed the gypsum at a uniform rate into what I may term the head end of a calcining chamber, and to form what I may term a block or plug of gypsum that seals that end of the chamber. For these purposes the spiral conveyer 11 is made with a diminishing pitch toward the discharge end, and the gypsum delivered to the coarser pitch end of the spiral is gradually banked up in those portions of casing 12 that are occupied by the finer pitch end of the spiral, so that at about the point marked A, for instance, in Fig. 1 the gypsum forms a complete plug closing the casing against the back passage of a gas that is introduced through pipe 13. At its discharge end this conveyer delivers the gypsum into connecting pipe 14 that goes to the head or receiving end of calcining chamber 15. This chamber may, in the form of apparatus shown in Fig. 1, be conveniently made of a fairly long pipe of suitable diameter, whose delivery end discharges into a separating chamber 16.

Separating chamber 16 may be at an elevation above the receiving end of calcining chamber 15, in which case the feeding mechanism is subject to a back pressure equivalent to a column of the fluidized mixture represented by the vertical distance between the feeder and the discharge end of the calcining chamber, plus any frictional resistance of the chamber walls. The fluidizing gas must be introduced at a pressure at least sufficiently above this back pressure to intimately mix with the powdered gypsum, and convert it, with the gas, into a freely flowing mixture—a fluidized mass.

The gypsum, fed at a uniform rate into the head end of chamber 15, is moved along through that chamber by the feeding action of the conveyor and by the gas that is introduced through pipe 13 in sufficient quantity to fluidize and mobilize the gypsum, and which gas may be heated to a sufficiently high temperature to give to the gypsum either all or part of the heat necessary for calcination. The amount of heat which the mobilizing gas may give to the gypsum, of course, depends upon the amount of heat carried by the gas above calcining temperature; and this in turn depends upon the quantity of gas and its temperature. In theory the quantity of gas, in proportion to the quantity of gypsum, could be made sufficient, at any given temperature of the gas above calcining temperature, to enable the gas to carry and to transfer to the gypsum all the heat necessary for calcination; and the chamber 15 could be made long enough that the particles of gypsum, although relatively widely dispersed, would by turbulence come into intimate contact with all parts of the gas by the time the end of the chamber would be reached, so that the gas would give up all its heat in excess over the calcining temperature. But practical mechanical considerations, and the fact that the initial temperature of the gas cannot be too high, may make it necessary to supply a substantial part or the major part of the calcining heat by means of exteriorly heating chamber 15, as by a steam jacket 17, which may be insulated as at 18 to minimize heat losses.

As the gypsum and gas are fed into the head end of the calcining chamber, the first action of the gas is to fluidize the gypsum—to form a fluid mixture with the gypsum. This it does by forming very much the same type of mixture that is formed by sand and water when the two form a fluid, freely flowing, mixture. Suspension of the solid particles in the fluid is not necessarily a part of such fluidizing action; the finely divided solid may be fluidized—the mixture made free flowing—by use of a much smaller proportion of fluid—gas, in this case—than is necessary if the solid is to be carried or blown along in suspension.

Thus the first action of the gas in my process is to fluidize the gypsum, to form with it a fluid, free flowing, mixture; and that is what I mean by the term "fluidize" as used in this description and the following claims. The gas, however, has a farther function of actually causing movement, or contributing to the movement of the fluidized mixture. The mixture being free flowing, the continued introduction of gypsum and gas at the head end of the calcining chamber causes movement of that fluid mixture. The introduction of gas is not the sole cause of movement; the introduction of gypsum is also a cause; but the gas does have that moving function in addition to its fluidizing function. Consequently, in using the term "mobilize" herein, I mean to refer to the total action of the gas, both that of fluidizing the gypsum—rendering it mobile—and that of actually moving it. The term "mobilize" as here used includes, as one element of its meaning, the meaning of the term "fluidize" as here used.

Air or any other gas heated to a proper temperature may be used as a mobilizing and heating medium, and, as I hereinafter point out, any suitable means may be used for extraneously heating chamber 15. Either by the means above explained (proportion of gas and gypsum) or by means of external heating, the temperature in the calcining chamber should not be allowed at any time to fall below actual calcining temperature (about 250° F.) and should preferably not be allowed to fall below say 330° F., so that there may be no possibility of condensation of water vapor within the chamber. The gas together with its gypsum passes out at the end of chamber 15 into the separator 16, where the gypsum falls to the bottom and the gas may be taken off through dome 16$^a$ and pipe 20 to be reused. By reuse of the mobilizing and heating medium the heat still remaining in it is not lost.

Although, as I have said, air or any other gas may be used as the mobilizing and heating medium, I prefer more specifically to use steam. This is so for various reasons, among which is the fact that steam has a high specific heat and also because in the calcination operation the water of crystallization liberated from the gypsum is transformed into water vapor. By utilizing steam as the mobilizing and heating medium, I then have at the delivery end of the chamber only one substance —steam— to deal with; and this steam or its equivalent condensate may be readily reutilized and a great deal of heat thereby saved.

Thus steam as a mobilizing and heating medium may be introduced through pipe 13 under control of valve 13$a$ and this steam may be superheated in superheater 25. Also steam from the superheater may be admitted to heating jacket 17 under control of valve 26. Although the steam for these purposes may be obtained from any suitable source, as from an ordinary boiler, I may prefer to obtain it from gypsum that is being calcined in kettles. For instance, I may have a plurality of gypsum kettles 27 connected up by lines 28 with a line 29 running to the superheater, the kettles being heated in suitable furnaces 30 to the required temperature. The gypsum in one kettle may be in process of calcination, while the other is being emptied and filled. Steam from the water driven off the gypsum at the calcining temperatures is at considerable pressure; then by superheating this steam it is made to carry a considerable quantity of heat above the calcination temperature; so that when this steam is introduced to the heating and calcinating chamber and to the heating jacket it will carry a sufficient quantity of heat that it may give up to the gypsum to cause calcination. If no external heating of chamber 15 is to be resorted to (no heating by use of steam jacket 17), then the steam that is put in through connection 13 is superheated to such a point that in falling to a temperature somewhat above the calcination temperature it will give up enough heat to the gypsum to calcine it and vaporize the water driven off from the gypsum, producing from that water a dry steam at the pressure utilized in the calcinating chamber. The pressure there utilized may be comparatively low, that pressure is regulated by regulation of valve 13$a$ and valve 20$a$ on the steam delivery line and by regulation of the operations of condenser 35. But whatever the pressure may be, and however the chamber is located, the temperature is at all times kept somewhat above the calcining point and enough heat is supplied either in the mobilizing steam itself or in that mobilizing steam together with the external heating steam, or in the external heating steam (if the mobilizing gas is not initially heated to a temperature above the calcining temperature), to keep the water vapor within the chamber (steam originally introduced and the steam resulting from calcination) at such a temperature with relation to the pressure utilized that the steam does not become wet. This condition may be assured, for instance, by keeping the temperature in the chamber always well above calcination point and maintaining a pressure within the chamber substantially less than the saturated water vapor pressure corresponding to the temperature thus maintained. Thermometers T facilitate the correct maintenance of temperatures. Operating in this manner the gypsum can never become superficially wetted; therefore, when separated from the steam it does not carry away with it any moisture which may go back into crystalline combination with it when the gypsum is cooled. This provision and the provision of keeping the gypsum at or above calcination temperature until it is separated from the steam provides for a perfectly calcined product which is perfectly dry.

In separating chamber 16 the finely divided gypsum separates by gravity from the steam or other mobilizing gas, falling to the bottom of chamber 16 while the steam or other gas rises into dome 16a to pass off through pipe 20. The mass of gypsum in the bottom of chamber 16 forms more or less of a block or plug, and this mass of gypsum passes into conveyer 12a (similar to conveyer 12) which also forms a plug of gypsum and delivers the gypsum to a cooler 36, from which the gypsum goes to bin 37. Thus it will be seen that the gypsum when cooled is well separated from the steam and cannot be wetted. The resultant product is either ready for market or may be finally reground or given any other desired treatment before being sacked.

Although I have described conveyer chamber 12, calcining chamber 15, and separating chamber 16, as being separate chambers, it is seen that they are intercommunicating and that, although preferably constructed as separate parts or pieces, they in effect may be considered as a single chamber. In such a single or continuous chamber the first gypsum plug is formed by screw 11 near one chamber end, the second plug is formed near the other chamber end just beyond the point where the gypsum and steam are separated, and the mobilizing and calcination of the gypsum takes place in the chamber space between the two plugs.

The steam goes through pipe 20 to condenser 35 where all the moisture is recovered to be put into storage by pump 38. This saving of water is of some consequence in gypsum calcination, as gypsum deposits are very often found in dry countries where obtainance of water supply is difficult and expensive. Obtaining the steam initially from gypsum calcination in kettles may effect a further economy as regards water supply. Either all or a part of the steam supply for a plant may be thus obtained. Instead of condensing the steam in a condenser, the heat of the steam may be used in other manners— as, for instance, in drying gypsum or gypsum products. Often gypsum products are made at a calcining plant, and the steam heat may be efficiently used for drying them. Also, as will readily be seen, the excess water obtained from calcination may, after condensation, be used to hydrate the calcined gypsum in the manufacture of such gypsum products.

In Figure 2 I show a slightly modified form of plant. Here the heating and calcining chamber may be formed in one or more pipes 15c, which extend either vertically or horizontally through a furnace 40, which supplies heat externally to these chambers. Otherwise the essentials of the apparatus shown in Fig. 2 are the same as that shown in Fig. 1. The gypsum kettle or kettles 27 may be conveniently heated in the same furnace 40 or in an extension 40a thereof.

From what has been said it will now be understood that my process and apparatus have many advantages over known processes and eliminate many if not all of their disadvantages and shortcomings. My process has the highest efficiency in operation as to both fuel consumption and labor. The intimate contact of the finely ground gypsum with the heating medium, or its dispersal in the stream of fluidizing and mobilizing gas in a heated calcining chamber, provides for efficient heat transfer. It has perfect continuity of operation and produces a finally finished product continuously delivered to the receiving bins. The plant is of simple construction, lends itself readily to accurate temperature control. There are no dust losses; and even the water used is condensed and re-utilized. Besides re-using the water it will, of course, be understood that the hot water from the condenser or other apparatus may be put directly back into the boiler so that a great deal of the heat is not lost; or the cooled steam without condensation may be, under certain circumstances, pumped directly back to the superheater to be reheated to the desired operating temperature. Furthermore, the pressure in the heating and calcining chamber may be made as low as desired; by proper arrangements it may be made even sub-atmospheric, and under such conditions the calcining temperature may be considerably lowered. In addition to all these advantages, there are numerous others unnecessary to name in detail, but which may be summed up by saying that my process involves much less machinery and mechanical appliances than the present known processes.

It will also now be understood that my process and apparatus are not limited necessarily to calcination of gypsum, but may be applied to the heat decomposition of other materials. In instance, calcium carbonate is broken down by heat to lime and carbon dioxide; and this and other similar operations may be, broadly considered, carried on by my invention. However, in its more specific aspects, the invention has certain advantages as applied to calcination of gypsum, as have been set out.

I claim:

1. The process of continuously calcining raw gypsum that includes moving finely divided raw gypsum through a chamber in a stream of superheated steam at a predetermined pressure, the superheat of the steam over its temperature of condensation at said pressure being sufficient to impart to the gypsum the heat necessary for its calcination without the steam being reduced in temperature to its temperature of condensation.

2. The process of continuously calcining raw gypsum that includes moving finely divided raw gypsum through a chamber in a stream of steam at a predetermined pressure and superheated to a temperature above the temperature of gypsum calcination, heating the chamber exteriorly, the superheat of the steam over its temperature of condensation at said pressure being sufficient, together with the exterior heating, to impart to the gypsum the heat necessary for its calcination without the steam being reduced in temperature to its temperature of condensation.

3. The process of continuously calcining gypsum, that includes moving finely divided gypsum through a chamber, in direct contact with, and by mobilization with, steam which is at a temperature to maintain gypsum calcining temperature.

4. The process of continuously calcining gypsum, including continuously moving gypsum through a calcining chamber by mobilizing with a gas heated to above the calcining temperature of gypsum and with which gas the gypsum is in direct contact during movement, maintaining such movement and contact until the gypsum is heated and calcined to the desired degree, and then separating the calcined gypsum from the gas and the water vapor evolved in calcination.

5. The process of continuously calcining raw gypsum, which includes the steps of moving finely divided gypsum through an inclosed space in association with and fluidized by a current of gas which is at a temperature above gypsum calcining temperature, and simultaneously heating the mixture to the temperature of gypsum calcination, whereby the moisture in the raw gypsum is vaporized and the raw gypsum calcined, drawing off from the heated gypsum the water vapor thus formed together with the fluidizing gas, and subsequently cooling the calcined gypsum.

6. The process of continuously calcining raw gypsum, which includes the steps of moving finely divided gypsum through an inclosed space in association with and fluidized by a current of gas under pressure and heated to a temperature above the calcining point of gypsum, whereby the raw gypsum is heated and calcined during movement and its moisture vaporized, drawing off from the heated gypsum the water vapor thus formed together with the fluidizing gas, and subsequently cooling the calcined gypsum.

7. The process of continuously calcining raw gypsum, which includes the steps of moving finely divided gypsum through an inclosed space in association with and fluidized by a current of steam which is at a temperature above gypsum calcining temperature, and simultaneously heating the mixture to the temperature of gypsum calcination, whereby the moisture in the raw gypsum is vaporized and the raw gypsum calcined, drawing off from the heated gypsum the water vapor thus formed together with the fluidizing steam, and subsequently cooling the calcined gypsum.

8. The process of continuously calcining raw gypsum, which includes the steps of moving finely divided gypsum through an inclosed space in association with and fluidized by a current of steam under pressure and superheated to a temperature above the calcining point of gypsum, whereby the raw gypsum is heated and calcined during movement and its moisture vaporized, drawing off from the heated gypsum the water vapor thus formed together with the fluidizing steam, and subsequently cooling the calcined gypsum.

9. The process of continuously calcining finely divided raw gypsum, which includes continuously feeding the gypsum into a chamber at one point, continuously feeding a heated gas into the chamber near the point of gypsum feed and causing the admixture of the gypsum and gas to form a fluidized mixture, whereby the gypsum is both mobilized and heated by the gas and its water vaporized and the raw gypsum calcined, and continuously drawing off the calcined gypsum and the fluidizing gas and water vapor from the chamber at a point removed from the point of gypsum feed.

10. The process of continuously calcining finely divided raw gypsum, which includes continuously feeding the gypsum into a chamber at one point, continuously feeding steam under pressure, and superheated to a temperature above the calcination temperature of gypsum, into the chamber near the point of gypsum feed and causing the admixture of the gypsum and steam to form a fluidized mixture, whereby the gypsum is both mobilized and heated by the steam and its water vaporized and the raw gypsum calcined, and continuously drawing off the calcined gypsum and the fluidizing steam and the evolved water vapor from the chamber at a point removed from the point of gypsum feed.

11. The process of continuously calcining raw gypsum, including forming a plug of powdered raw gypsum in and across a chamber, introducing gas under pressure to, and admixing it with, the gypsum at one side of the plug, thereby forming a fluid mixture and causing such mixture of flow through the chamber away from that side of the plug, the gas being heated to the temperature of gypsum calcination and the gypsum in the mixture being in intimate contact with the gas and being thereby heated and calcined and its moisture vaporized during said movement, maintaining said plug by continuously feeding raw gypsum into the other side of said plug at a rate equal to the rate of gypsum movement away from said plug, accumulating the calcined gypsum into another plug extending across the chamber at a point removed from the first mentioned plug in the direction of gypsum movement, said two plugs serving to confine the movement of the mixture of gypsum and gas and evolved water vapor to the chamber space between them and to exclude exterior atmosphere from said space, continuously taking calcined gypsum away from the outer side of the last mentioned plug at a rate equal to the accumulation of gypsum at that plug, and drawing off the gas and evolved water vapor from said space at a point near the second mentioned plug.

12. The process of continuously calcining raw gypsum, including forming a plug of powdered raw gypsum in and across a chamber, introducing and admixing steam to and with the gypsum at one side of the plug, thereby forming a fluid mixture and causing such mixture to flow through the chamber away from that side of the plug, the steam being at a temperature above the calcining point of gypsum and the gypsum in the mixture being in intimate contact with the steam and being thereby heated and calcined and its moisture vaporized during said movement, maintaining said plug by continuously feeding raw gypsum into the other side of said plug at a rate equal to the rate of gypsum movement away from said plug, accumulating the calcined gypsum into another plug extending across the chamber at a point removed from the first mentioned plug in the direction of gypsum movement, said two plugs serving to confine the movement of the mixture of gypsum and steam and evolved water vapor to the chamber space between them and to exclude exterior atmosphere from said space, continuously taking calcined gypsum away from the outer side of the last mentioned plug at a rate equal to the accumulation of gypsum at that plug, and drawing off the steam and evolved water vapor from said space at a point near the second mentioned plug.

In witness that I claim the foregoing I have hereunto subscribed my name this 7th day of August, 1925.

ALVA W. TYLER.

CERTIFICATE OF CORRECTION.

Patent No. 1,798,857.                          Granted March 31, 1931, to

ALVA W. TYLER.

It is hereby certified that error appears in the printed specification of the above numbered patent requiring correction as follows: Page 6, line 21, claim 11, for the word "of" read to; and that the said Letters Patent should be read with this correction therein that the same may conform to the record of the case in the Patent Office.

Signed and sealed this 15th day of December, A. D. 1931.

(Seal)                                             M. J. Moore,
                                                   Acting Commissioner of Patents.